US012733031B2

(12) United States Patent
Kang et al.

(10) Patent No.: US 12,733,031 B2
(45) Date of Patent: Sep. 8, 2026

(54) COMMUNICATION APPARATUSES AND COMMUNICATION METHODS FOR SELECTION AND SENSING WINDOWS FOR NR SIDELINK UEs WITH PARTIAL SENSING

(71) Applicant: Panasonic Intellectual Property Corporation of America, Torrance, CA (US)

(72) Inventors: Yang Kang, Singapore (SG); Hidetoshi Suzuki, Kanagawa (JP); Hong Cheng Michael Sim, Singapore (SG); Xuan Tuong Tran, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 351 days.

(21) Appl. No.: 18/260,728

(22) PCT Filed: Nov. 15, 2021

(86) PCT No.: PCT/SG2021/050698
§ 371 (c)(1),
(2) Date: Jul. 7, 2023

(87) PCT Pub. No.: WO2022/154750
PCT Pub. Date: Jul. 21, 2022

(65) Prior Publication Data

US 2024/0057157 A1 Feb. 15, 2024

(30) Foreign Application Priority Data

Jan. 18, 2021 (SG) .......................... 10202100540W
Mar. 30, 2021 (SG) .......................... 10202103261R

(51) Int. Cl.
*H04W 74/08* (2024.01)
*H04W 74/00* (2009.01)
*H04W 74/0808* (2024.01)

(52) U.S. Cl.
CPC ..... *H04W 74/0808* (2013.01); *H04W 74/002* (2013.01)

(58) Field of Classification Search
CPC ............. H04W 74/0808; H04W 72/02; H04W 74/002; H04W 52/0216; H04W 76/14; H04W 92/18; H04L 5/0044
See application file for complete search history.

(56) References Cited

U.S. PATENT DOCUMENTS

2019/0132832 A1 5/2019 Uchiyama et al.
2019/0306835 A1* 10/2019 Hoang .................. H04W 72/53
(Continued)

FOREIGN PATENT DOCUMENTS

CN 108024318 A 5/2018
JP 2020092454 A 6/2020
WO WO 2018145067 A1 8/2018

OTHER PUBLICATIONS

Ericsson, "Resource allocation mechanisms for power saving," R1-2009072, Agenda Item: 8.11.2.1, 3GPP TSG-RAN WG1 Meeting #103-e, Online, Oct. 26-Nov. 13, 2020. (6 pages).
(Continued)

*Primary Examiner* — Brian D Nguyen
(74) *Attorney, Agent, or Firm* — Seed Intellectual Property Law Group LLP

(57) ABSTRACT

The present disclosure provides communication apparatuses and communication methods for selection and sensing windows for new radio (NR) sidelink user equipments (UEs) with partial sensing. The communication apparatuses include a communication apparatus comprising: circuitry which, in operation, determines a first plurality of time
(Continued)

resources for resource selection, a second plurality of time resources for resource sensing, and a first subset of time resources from the first plurality of time resources, the first subset of time resources being a selection window for partial sensing, and selects a portion of the first subset of time resources; and a transmitter which, in operation, transmits a sidelink (SL) signal in the selected portion of the first subset of time resources.

14 Claims, 15 Drawing Sheets

(56) References Cited

U.S. PATENT DOCUMENTS

| | | | | |
|---|---|---|---|---|
| 2020/0029245 | A1 | 1/2020 | Khoryaev et al. | |
| 2020/0100215 | A1* | 3/2020 | Li | H04W 72/535 |
| 2022/0400527 | A1* | 12/2022 | Yoon | H04W 76/23 |
| 2023/0247596 | A1* | 8/2023 | Selvanesan | H04W 4/44<br>370/329 |
| 2023/0254831 | A1* | 8/2023 | Su | H04W 72/40<br>370/329 |
| 2023/0262765 | A1* | 8/2023 | Zhou | H04W 74/0816<br>370/329 |
| 2023/0319950 | A1* | 10/2023 | Do | H04W 76/28<br>370/311 |
| 2023/0337188 | A1* | 10/2023 | Selvanesan | H04W 72/044 |
| 2023/0389054 | A1* | 11/2023 | Leon Calvo | H04W 72/40 |
| 2024/0080866 | A1* | 3/2024 | Luo | H04W 72/25 |

OTHER PUBLICATIONS

Extended European Search Report, dated May 15, 2024, for European Patent Application No. 21919983.3-1215. (13 pages).

Nokia, Nokia Shanghai Bell, "Discussion of resource allocation for power saving," R1-2007622, Agenda item: 8.11.2.1, 3GPP TSG RAN WG1 Meeting #103-e, e-Meeting, Oct. 26-Nov. 13, 2020. (5 pages).

3GPP TR 38.913 V16.0.0, "3rd Generation Partnership Project; Technical Specification Group Radio Access Network; Study on Scenarios and Requirements for Next Generation Access Technologies; (Release 16)," Jul. 2020. (40 pages).

3GPP TS 23.122 V17.4.0, "3rd Generation Partnership Project; Technical Specification Group Core Network and Terminals; Non-Access-Stratum (NAS) functions related to Mobile Station (MS) in idle mode (Release 17)," Sep. 2021. (107 pages).

3GPP TS 23.287 V16.4.0, "3rd Generation Partnership Project; Technical Specification Group Services and System Aspects; Architecture enhancements for 5G System (5GS) to support Vehicle-to-Everything (V2X) services (Release 16)," Sep. 2020. (58 pages).

3GPP TS 23.502 V16.3.0, "3rd Generation Partnership Project; Technical Specification Group Services and System Aspects; Procedures for the 5G System (5GS); Stage 2 (Release 16)," Dec. 2019. (558 pages).

3GPP TS 23.502 V16.6.0, "3rd Generation Partnership Project; Technical Specification Group Services and System Aspects; Procedures for the 5G System (5GS); Stage 2 (Release 16)," Sep. 2020. (597 pages).

3GPP TS 36.213 V16.4.0, "3rd Generation Partnership Project; Technical Specification Group Radio Access Network; Evolved Universal Terrestrial Radio Access (E-UTRA); Physical layer procedures (Release 16)," Dec. 2020. (572 pages).

3GPP TS 38.211 V16.3.0, "3rd Generation Partnership Project; Technical Specification Group Radio Access Network; NR; Physical channels and modulation (Release 16)," Sep. 2020. (133 pages).

3GPP TS 38.214 V16.3.0, 3rd Generation Partnership Project; Technical Specification Group Radio Access Network; NR; Physical layer procedures for data (Release 16), Sep. 2020. (166 pages).

3GPP TS 38.300 V16.3.0, "3rd Generation Partnership Project; Technical Specification Group Radio Access Network; NR; NR and NG-RAN Overall Description; Stage 2 (Release 16)," Sep. 2020. (148 pages).

ETSI TR 103 300-1 V2.1.1, "Intelligent Transport System (ITS); Vulnerable Road Users (VRU) awareness; Part 1: Use Cases definition; Release 2," Sep. 2019. (74 pages).

Fujitsu, "Considerations on partial sensing in NR V2X," R1-2007787, Agenda item: 8.11.2.1, 3GPP TSG RAN WG1 Meeting #103-E, e-Meeting, Oct. 26-Nov. 13, 2020. (18 pages).

International Search Report, mailed Feb. 10, 2022, for International Patent Application No. PCT/SG2021/050698. (4 pages).

International Telecommunication Union, "IMT Vision—Framework and overall objectives of the future development of IMT for 2020 and beyond; M Series; Mobile, radiodetermination, amateur and related satellite services," Recommendation ITU-R M.2083-0, Sep. 2015. (21 pages).

LG Electronics, "WID revision: NR sidelink enhancement," RP-202846 (revision of RP-202253), Agenda Item: 9.8.3, 3GPP TSG RAN Meeting #90e, Electronic Meeting, Dec. 7-11, 2020. (6 pages).

Qualcomm Incorporated, "Power Savings for Sidelink," R1-2009272, Agenda Item: 8.11.2.1, 3GPP TSG RAN WG1 Meeting #103-e, Oct. 26-Nov. 13, 2020. (8 pages).

"Regulation (EU) No. 168/2013 of the European Parliament and of the Council of Jan. 15, 2013 on the approval and market surveillance of two- or three-wheel vehicles and quadricycles," *2013 Official Journal of the European Union* (L60):52-128, Mar. 2, 2013.

* cited by examiner

COMMUNICATION APPARATUSES AND COMMUNICATION METHODS FOR SELECTION AND SENSING WINDOWS FOR NR SIDELINK UEs WITH PARTIAL SENSING

TECHNICAL FIELD

The following disclosure relates to communication apparatuses and communication methods for selection and sensing windows, and more particularly to communication apparatuses and communication methods for selection and sensing windows for new radio (NR) sidelink user equipments (UEs) with partial sensing.

BACKGROUND

Sidelink (SL) communication allows vehicles to interact with public roads and other road users through vehicle-to-everything (V2X) applications, and is thus considered a critical factor in making autonomous vehicles a reality. Other SL applications include P2P or I2P (infrastructure to pedestrian, or R2P roadside unit to pedestrian) communications.

Further, 5G NR based SL communications (interchangeably referred to as NR SL communications) is being discussed by the 3rd Generation Partnership Project (3GPP) to identify technical solutions for advanced V2X services, through which vehicles (i.e. interchangeably referred to as communication apparatuses or user equipments (UEs) that support V2X applications) can exchange their own status information through SL with other nearby vehicles, infrastructure nodes and/or pedestrians. The status information includes information on position, speed, heading, etc.

However, there has been no discussion on communication apparatuses and methods for selection and sensing windows for NR sidelink UEs with partial sensing.

There is thus a need for communication apparatuses and methods that provide feasible technical solutions for selection and sensing windows for NR sidelink UEs with partial sensing. Furthermore, other desirable features and characteristics will become apparent from the subsequent detailed description and the appended claims, taken in conjunction with the accompanying drawings and this background of the disclosure.

SUMMARY

Non-limiting and exemplary embodiment facilitates providing communication apparatuses and methods for selection and sensing windows for NR sidelink UEs with partial sensing.

According to a first embodiment of the present disclosure, there is provided a communication apparatus comprising: circuitry, which in operation, determines a first plurality of time resources for resource selection, a second plurality of time resources for resource sensing, and a first subset of time resources from the first plurality of time resources, the first subset of time resources being a selection window for partial sensing, and selects a portion of the first subset of time resources; and a transmitter, which in operation, transmits a SL signal in the selected portion of the first subset of time resources.

According to a second embodiment of the present disclosure, there is provided a communication method comprising: determining a first plurality of time resources for resource selection, a second plurality of time resources for resource sensing, and a first subset of time resources from the first plurality of time resources, the first subset of time resources being a selection window for partial sensing; selecting a portion of the first subset of time resources; and transmitting a sidelink (SL) signal in the selected portion of the first subset of time resources.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which.

Figure 1:
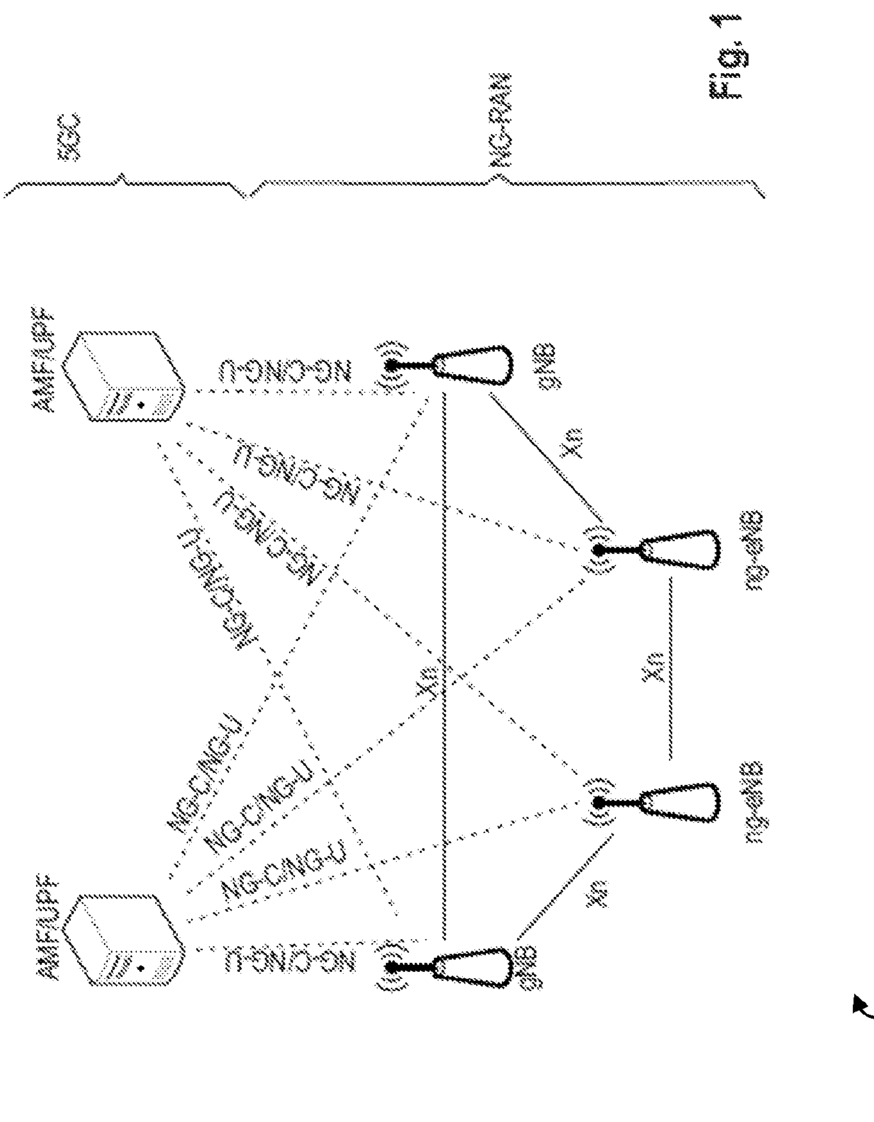
FIG. 1 shows an exemplary 3GPP NR-RAN architecture.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

Some embodiments of the present disclosure will be described, by way of example only, with reference to the drawings. Like reference numerals and characters in the drawings refer to like elements or equivalents.

3GPP has been working at the next release for the 5th generation cellular technology, simply called 5G, including the development of a new radio access technology (NR) operating in frequencies ranging up to 100 GHz. The first version of the 5G standard (rel. 15) was completed at the end of 2017, which allows proceeding to 5G NR standard-compliant trials and commercial deployments of smartphones. A recent version (rel. 16) was released in June 2020, which brings IMT-2020 submission for an initial full 3GPP 5G system to its completion and enabling more advanced features for sidelink communications.

Among other things, the overall system architecture assumes an NG-RAN (Next Generation—Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g. a particular core entity performing the AMF) by means of the NG-C interface and to the UPF (User Plane Function) (e.g. a particular core entity performing the UPF) by means of the NG-U interface. The NG-RAN architecture is illustrated in FIG. 1 (see e.g. 3GPP TS 38.300 v16.3.0, section 4).

The user plane protocol stack for NR (see e.g. 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see e.g. sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300. Further, sidelink communications is introduced in 3GPP TS 38.300 v16.3.0. Sidelink supports UE-to-UE direct communication using the sidelink resource allocation modes, physical-layer signals/channels, and physical layer procedures (see for instance section 5.7 of TS 38.300).

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For instance, the physical channels are PRACH (Physical Random Access Channel), PUSCH (Physical Uplink Shared Channel) and PUCCH (Physical Uplink Control Channel) for uplink and PDSCH (Physical Downlink Shared Channel), PDCCH (Physical Downlink Control Channel) and PBCH (Physical Broadcast Channel) for downlink. Further, physical sidelink channels include Physical Sidelink Control Channel (PSCCH), Physical Sidelink Shared Channel (PSSCH), Physical Sidelink Feedback Channel (PSFCH) and Physical Sidelink Broadcast Channel (PSBCH).

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability ($1\text{-}10^{-5}$ within 1 ms). Finally, mMTC may preferably require high connection density (1,000,000 devices/$km^2$ in an urban environment), large coverage in harsh environments, and extremely long-life battery for low cost devices (15 years).

Therefore, the OFDM numerology (e.g. subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than a mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f = 1/T_u$. In a similar manner as in LTE systems, the term "resource element" can be used to denote a minimum resource unit being composed of one subcarrier for the length of one OFDWSC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v16.3.0).

Figure 2:
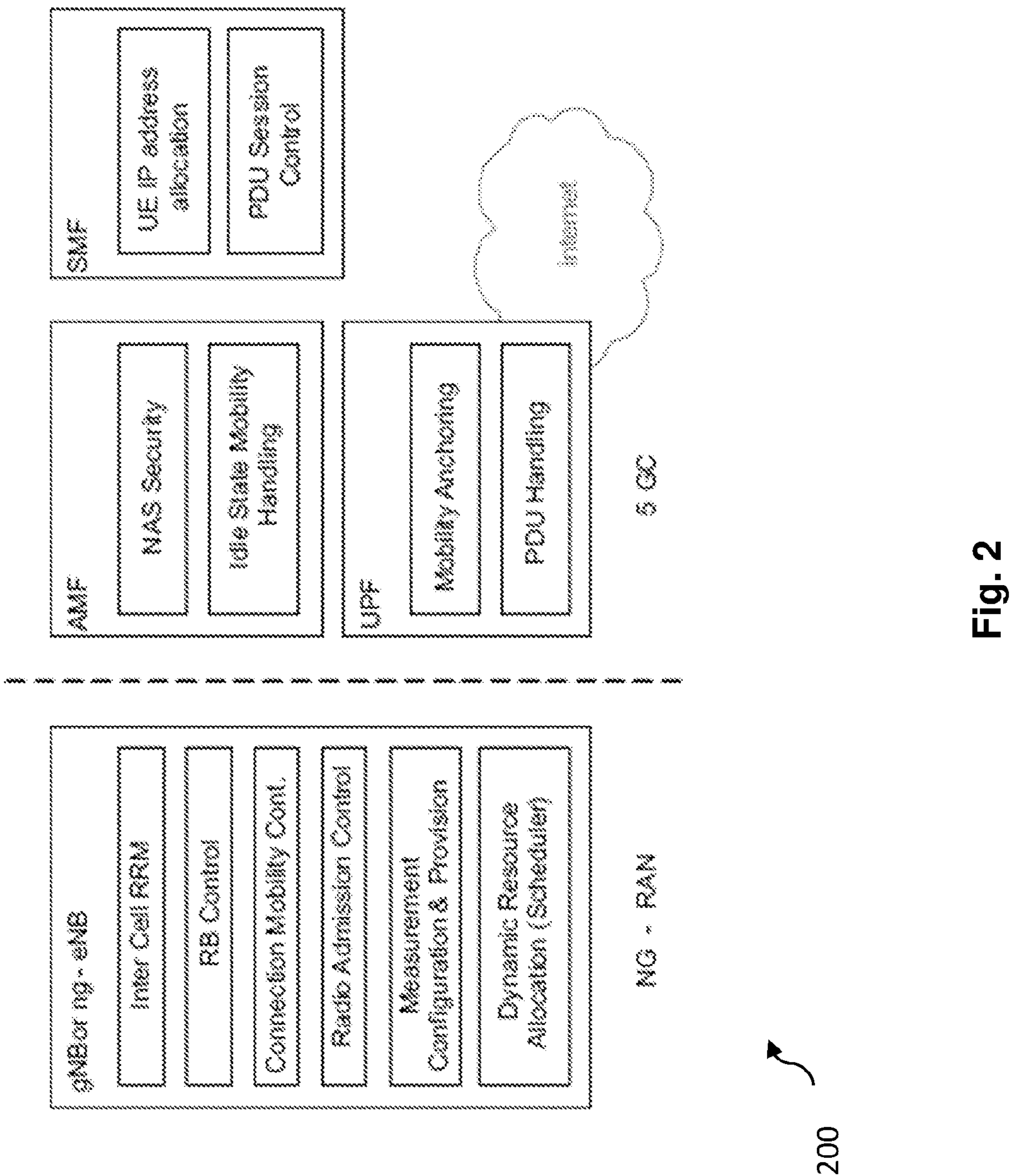
FIG. 2 depicts a schematic drawing which shows functional split between NG-RAN and 5GC.

FIG. 2 illustrates functional split between NG-RAN and 5GC. NG-RAN logical node is a gNB or ng-eNB. The 5GC has logical nodes AMF, UPF and SMF.

In particular, the gNB and ng-eNB host the following main functions:

- Functions for Radio Resource Management such as Radio Bearer Control, Radio Admission Control, Connection Mobility Control, Dynamic allocation of resources to UEs in both uplink and downlink (scheduling);
- IP header compression, encryption and integrity protection of data;

Selection of an AMF at UE attachment when no routing to an AMF can be determined from the information provided by the UE;
Routing of User Plane data towards UPF(s);
Routing of Control Plane information towards AMF;
Connection setup and release;
Scheduling and transmission of paging messages;
Scheduling and transmission of system broadcast information (originated from the AMF or OAM);
Measurement and measurement reporting configuration for mobility and scheduling;
Transport level packet marking in the uplink;
Session Management;
Support of Network Slicing;
QoS Flow management and mapping to data radio bearers;
Support of UEs in RRC_INACTIVE state;
Distribution function for NAS messages;
Radio access network sharing;
Dual Connectivity;
Tight interworking between NR and E-UTRA.

The Access and Mobility Management Function (AMF) hosts the following main functions:

Non-Access Stratum, NAS, signaling termination;
NAS signaling security;
Access Stratum, AS, Security control;
Inter Core Network, CN, node signaling for mobility between 3GPP access networks;
Idle mode UE Reachability (including control and execution of paging retransmission);
Registration Area management;
Support of intra-system and inter-system mobility;
Access Authentication;
Access Authorization including check of roaming rights;
Mobility management control (subscription and policies);
Support of Network Slicing;
Session Management Function, SMF, selection.

Furthermore, the User Plane Function, UPF, hosts the following main functions:

Anchor point for Infra-/Inter-RAT mobility (when applicable);
External PDU session point of interconnect to Data Network;
Packet routing & forwarding;
Packet inspection and User plane part of Policy rule enforcement;
Traffic usage reporting;
Uplink classifier to support routing traffic flows to a data network;
Branching point to support multi-homed PDU session;
QoS handling for user plane, e.g. packet filtering, gating, UL/DL rate enforcement;
Uplink Traffic verification (SDF to QoS flow mapping);
Downlink packet buffering and downlink data notification triggering.

Finally, the Session Management function, SMF, hosts the following main functions:

Session Management;
UE IP address allocation and management;
Selection and control of UP function;
Configures traffic steering at User Plane Function, UPF, to route traffic to proper destination;
Control part of policy enforcement and QoS;
Downlink Data Notification.

Figure 3:
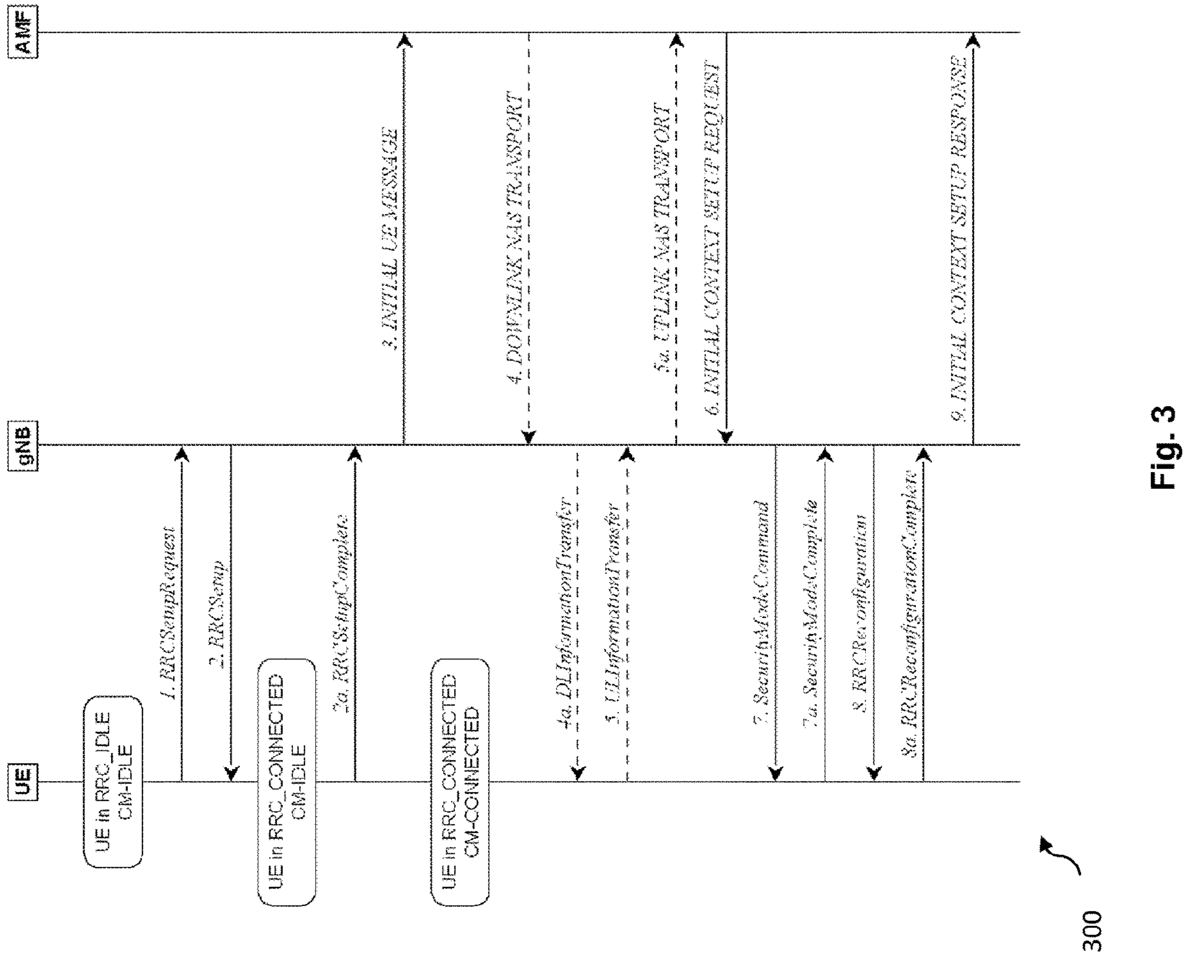
FIG. 3 depicts a sequence diagram for RRC (radio resource control) connection setup/reconfiguration procedures.

FIG. 3 illustrates some interactions between a UE, gNB, and AMF (an 5GC entity) in the context of a transition of the UE from RRC_IDLE to RRC_CONNECTED for the NAS part (see TS 38.300 v16.3.0). The transition steps are as follows:

1. The UE requests to setup a new connection from RRC_IDLE.

2/2a. The gNB completes the RRC setup procedure.

NOTE: The scenario where the gNB rejects the request is described below.

3. The first NAS message from the UE, piggybacked in RRCSetupComplete, is sent to AMF.

4/4a/5/5a. Additional NAS messages may be exchanged between UE and AMF, see TS 23.502 reference [22] (3GPP TS 23.122: "Non-Access-Stratum (NAS) functions related to Mobile Station in idle mode").

6. The AMF prepares the UE context data (including PDU session context, the Security Key, UE Radio Capability and UE Security Capabilities, etc.) and sends it to the gNB.

7/7a. The gNB activates the AS security with the UE.

8/8a. The gNB performs the reconfiguration to setup SRB2 and DRBs.

9. The gNB informs the AMF that the setup procedure is completed.

RRC is a higher layer signaling (protocol) used for UE and gNB configuration. In particular, this transition involves that the AMF prepares the UE context data (including e.g. PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

Figure 4:
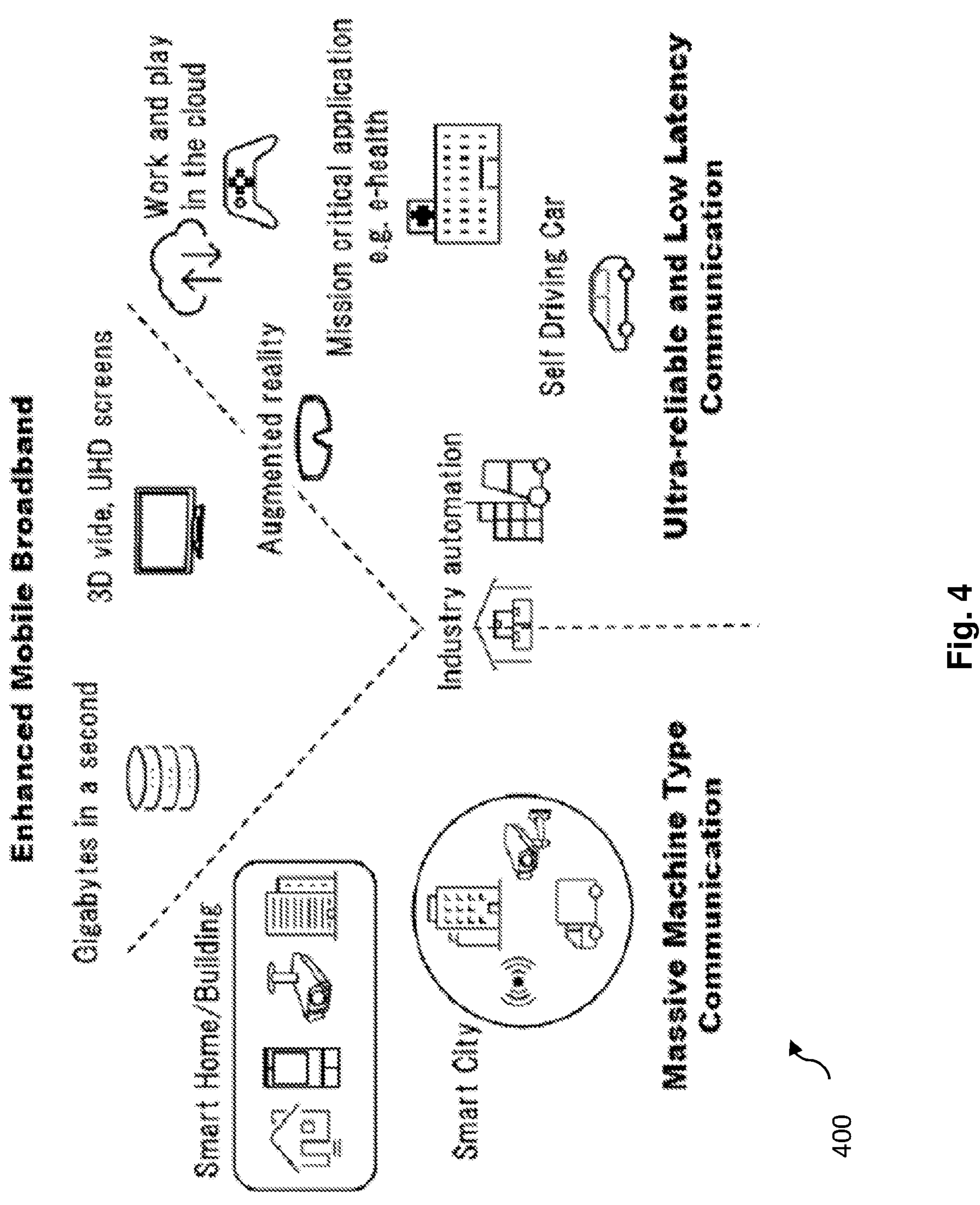
FIG. 4 depicts a schematic drawing showing usage scenarios of Enhanced mobile broadband (eMBB), Massive Machine Type Communications (mMTC) and Ultra Reliable and Low Latency Communications (URLLC).

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 4 illustrates some examples of envisioned usage scenarios for IMT for 2020 and beyond (see e.g. ITU-R M.2083 FIG. 2).

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1 E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLLC in Rel. 15 include Augmented RealityNirtual Reality (ARNR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated COI/MCS tables for the target BLER of 1 E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to $10^6$ level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLLC, several technology enhancements from the physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g. as shown above with reference to FIG. 3. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 5:
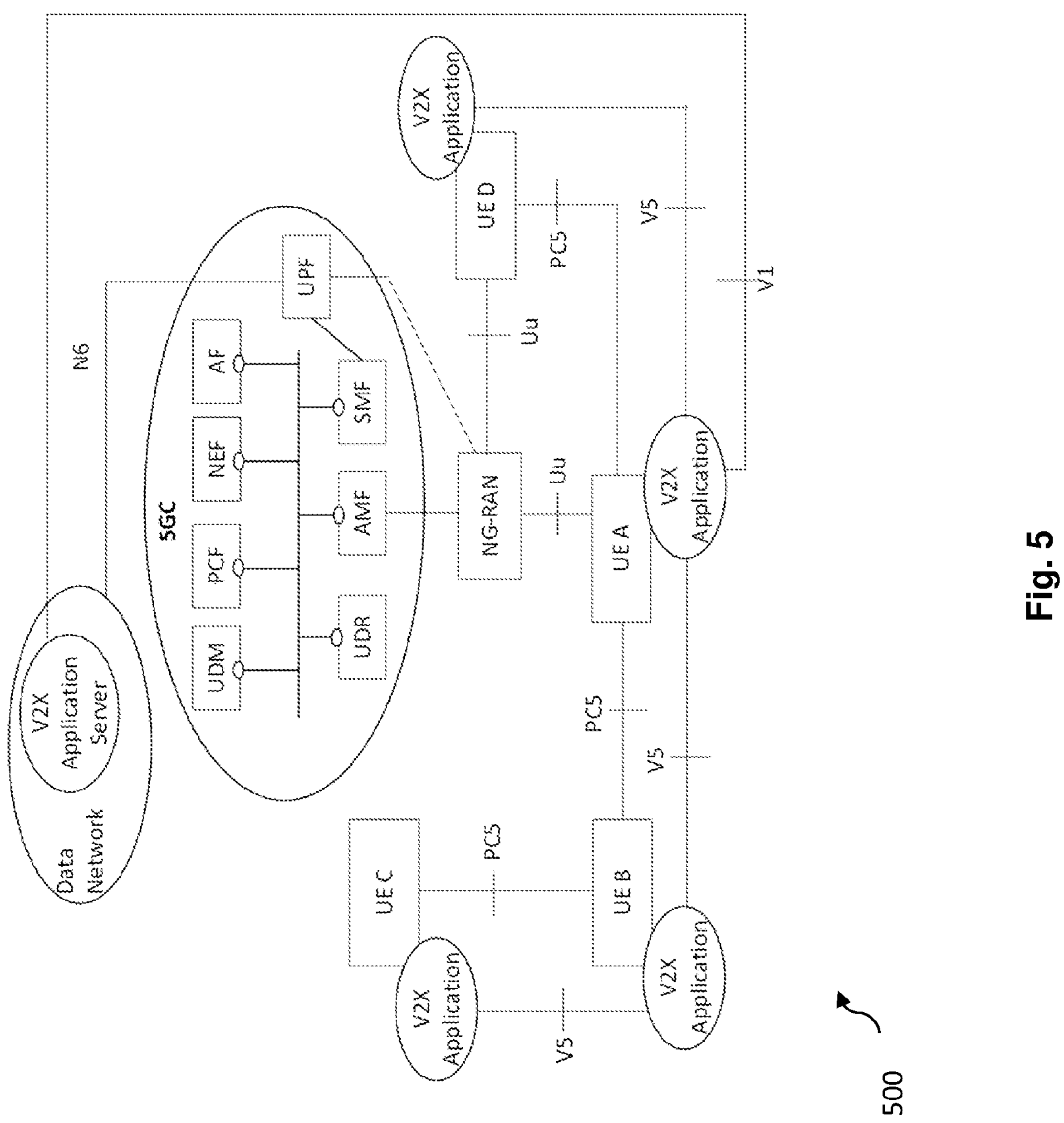
FIG. 5 shows a block diagram showing an exemplary 5G system architecture for V2X communication in a non-roaming scenario.

FIG. 5 illustrates a 5G NR non-roaming reference architecture (see TS 23.287 v16.4.0, section 4.2.1.1). An Application Function (AF), e.g. an external application server hosting 5G services, exemplarily described in FIG. 4, interacts with the 3GPP Core Network in order to provide services, for example to support application influence on traffic routing, accessing Network Exposure Function (NEF) or interacting with the Policy framework for policy control (see Policy Control Function, PCF), e.g. QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 5 shows further functional units of the 5G architecture for V2X communication, namely, Unified Data Management (UDM), Policy Control Function (PCF), Network Exposure Function (NEF), Application Function (AF), Unified Data Repository (UDR), Access and Mobility Management Function (AMF), Session Management Function (SMF), and User Plane Function (UPF) in the 5GC, as well as with V2X Application Server (V2AS) and Data Network (DN), e.g. operator services, Internet access or 3rd party services. All of or a part of the core network functions and the application services may be deployed and running on cloud computing environments.

In the present disclosure, an application server (for example, V2X Application Server in FIG. 5) may be provided to handle QoS requirements for V2X communications as per defined in Section 5.4 of TS23.287.

Power saving for UEs has been discussed in re1.17 V2X WID (RP-202846). Power saving enables UEs with battery constraint to perform sidelink operations in a power efficient manner. ReI-16 NR sidelink is designed based on the assumption of "always-on" when UE operates sidelink, e.g., only focusing on UEs installed in vehicles with sufficient battery capacity. Solutions for power saving in ReI-17 are required for vulnerable road users (VRUs) in V2X use cases and for UEs in public safety and commercial use cases where power consumption in the UEs needs to be minimized.

According to ETSI TR 103 300-1, the following types of road users are considered as vulnerable road users.

Pedestrians (including children, elderly, joggers).

Emergency responders, safety workers, road workers.

Animals such as horses, dogs down to relevant wild animals (see note below).

Wheelchairs users, prams.

Skaters, Skateboards, Segway, potentially equipped with an electric engine.

Bikes and e-bikes with speed limited to 25 km/h (e-bikes, class L1 a-A [i.8]).

High speed e-bikes speed higher than 25 km/h, class L1 e-B [i.8].

Powered Two Wheelers (PTW), mopeds (scooters), class L1 a [i.8].

PTW, motorcycles, class L3e [i.8];

PTW, tricycles, class L2e, L4e and L5e [i.8] limited to 45 km/h;

PTW, quadricycles, class L5e and L6e [i.8] limited to 45 km/h.

NOTE: Relevant wild animals are only those which present a safety risk to other road users (VRUs, vehicles)

The classification in Annex 1 of Regulation (EU) 168/2013 [i.8] may also be considered.

Further, in the RAN1 #103-e meeting, partial sensing was agreed to be supported in re1.17 as a power saving resource allocation scheme but not defined yet. Full sensing procedures for NR and LTE have been defined by 3GPP, both featuring a sensing window and a selection window of continuous slots. For example, FIG. 6 shows an illustration 600 of a NR full sensing operation with a sensing window 602 and a selection window 604, while FIG. 7 shows an illustration 700 of an LTE full sensing operation with a sensing window 702 and a selection window 704.

Figure 6:
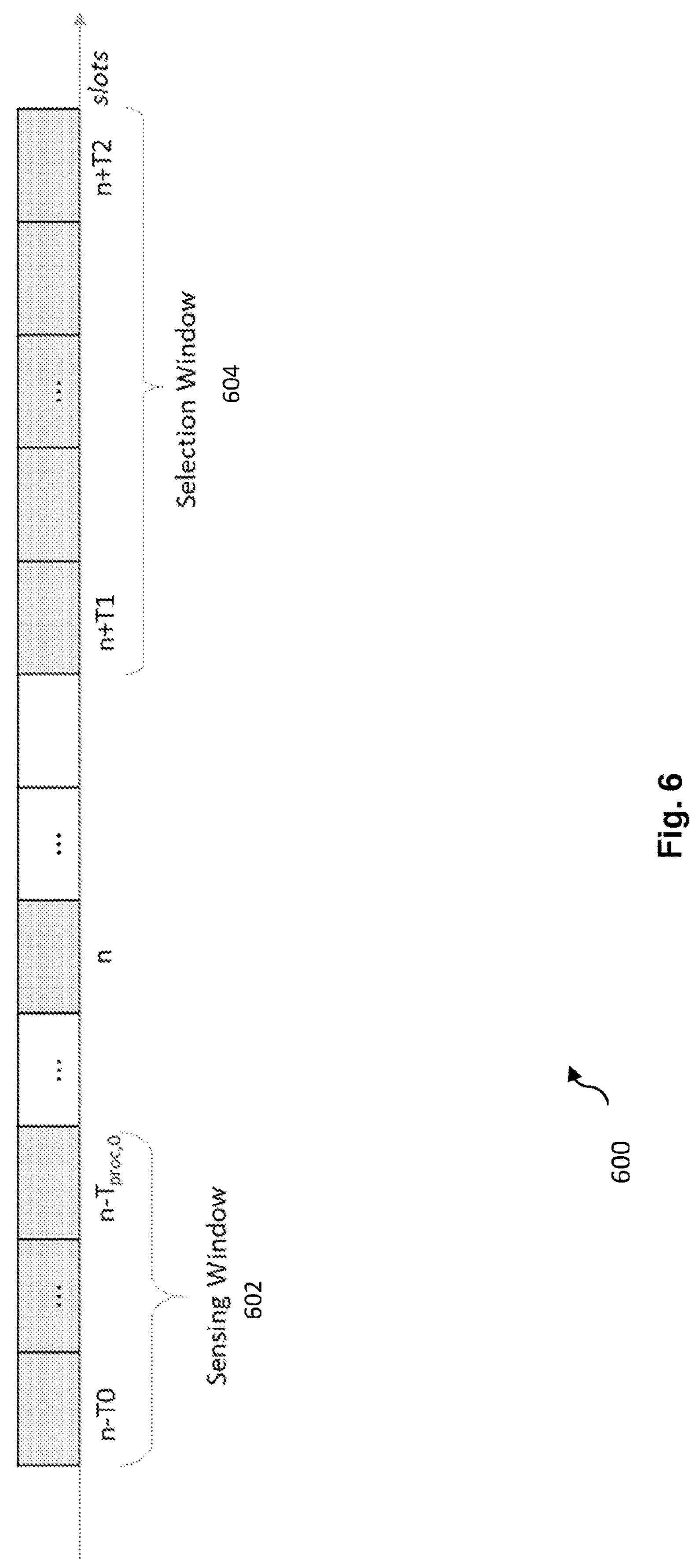
FIG. 6 shows an illustration of a sensing window and selection window for a NR full sensing operation according to various embodiments.
Figure 7:
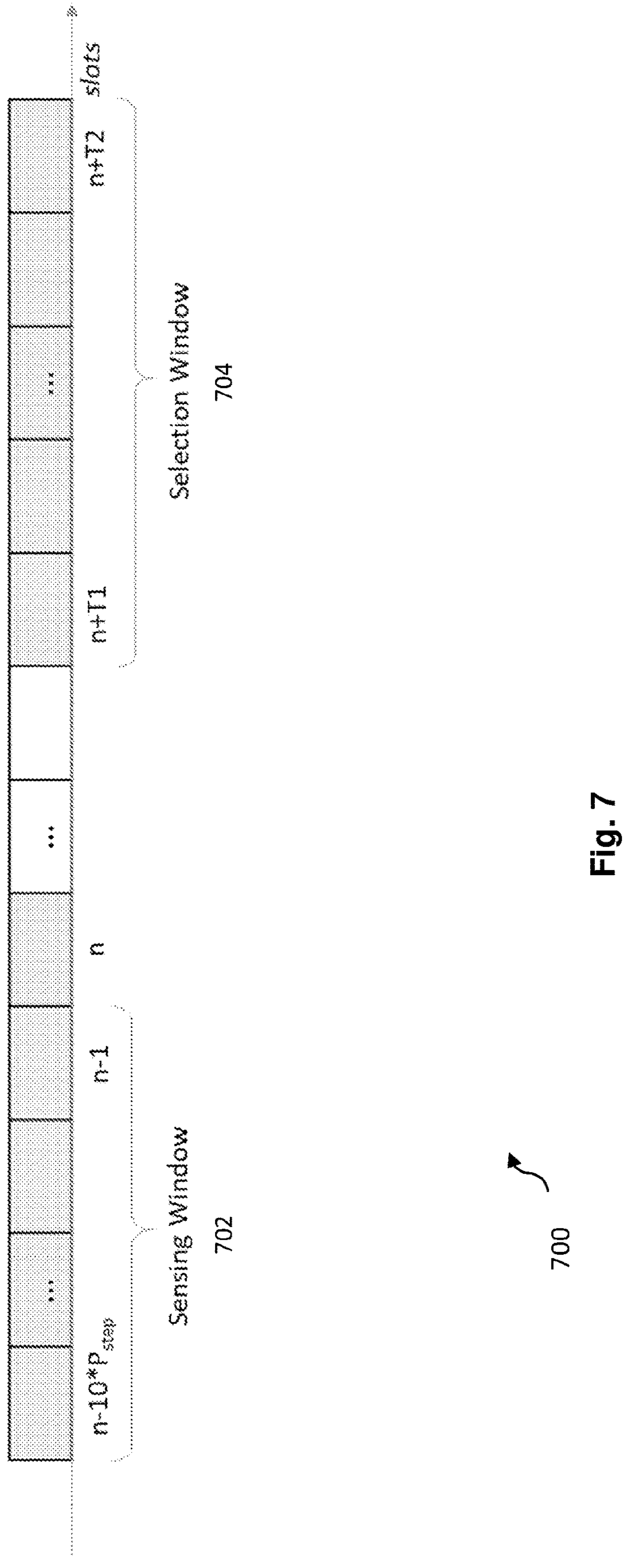
FIG. 7 shows an illustration of a sensing window and selection window for an LTE full sensing operation according to various embodiments.

FIG. 6, with reference to section 8.1.4 of TS38.214, the UE shall assume that any set of $L_{subcH}$ contiguous sub-channels included in the corresponding resource pool within the time interval $[n+T_1, n+T_2]$ (i.e. selection window 604) correspond to one candidate single-slot resource, where selection of $T_1$ is up to UE implementation under $$0 \le T_1 \le T^{SL}_{proc,1},$$

where $$T^{SL}_{proc,1}$$

is defined in slots in Table 8.1.4-2 of TS38.214, where $\mu_{SL}$ is the subcarrier spacing (SCS) configuration of the SL bandwidth part (BWP); if $T_{2mtn}$ is shorter than the remaining packet delay budget (in slots) then $T_2$ is up to UE implementation subject to $T_{2min} \le T_2 \le$remaining packet budget (in slots); otherwise $T_2$ is set to the remaining packet delay budget (in slots).

In FIG. 7, the UE shall assume that any set of $L_{subcH}$ contiguous sub-channels included in a corresponding PSSCH resource pool (described in 14.1.5 of TS36.213) within the time interval $[n+T_1,n+T_2]$ (i.e. selection window 704) corresponds to one candidate single-subframe resource, where selections of $T_1$ and $T_2$ are up to UE implementations under $T_1 \le 4$ and $T_{2min}(prio_{Tx}) \le T_2$ 100, if $T_{2min}$ $(prro_{TX})$ is provided by higher layers for $prio_{Tx}$, otherwise $20 \le T_2 \le 100$. UE selection of $T_2$ shall fulfil the latency requirement.

In both FIGS. 6 and 7, a time t=n when SL grant is received, the UE senses the PSCCHs in its sensing window (past timing) for its resource selection in its selection window (future timing).

For the defined LTE partial sensing procedure, the selection window is consisting of a subset of discrete subframes up to UE implementation. For each subframe in the selection window, the sensing subframes are a set of periodic subframes matching broadcast periodicity to reduce chance of in-air collisions (as LTE broadcasts are mostly periodic). All the corresponding sensing subframes consist of the sensing window for partial sensing.

However, it is not clear how the selection windows are determined for NR partial sensing as this is not defined in 3GPP yet. In LTE partial sensing, the subframes for selection windows are up to UE implementation and there is no coordination between UEs. The SL traffics in LTE are mostly periodic, while there are more aperiodic SL traffics in NR. Thus, the sensing/selection window would be designed differently for both cases. The NR partial sensing scheme to be defined is most likely to apply to handset UEs with limited power, which may only be active when performing sensing and selection, instead of being always active like LTE.

Therefore, for a NR UE performing partial sensing operation, the slots of the selection window may be pre-defined as pattern(s), instead of up to UE implementation as in LTE. The rules for defining the patterns may have different approaches. The pattern may also apply to the corresponding sensing window. Advantageously, by utilizing the patterns for selection/sensing windows, the resource utilization would be more efficient for both periodic and aperiodic traffics. Also, the potential in-air transmission collision among UEs would be largely avoided/mitigated.

Figure 8:
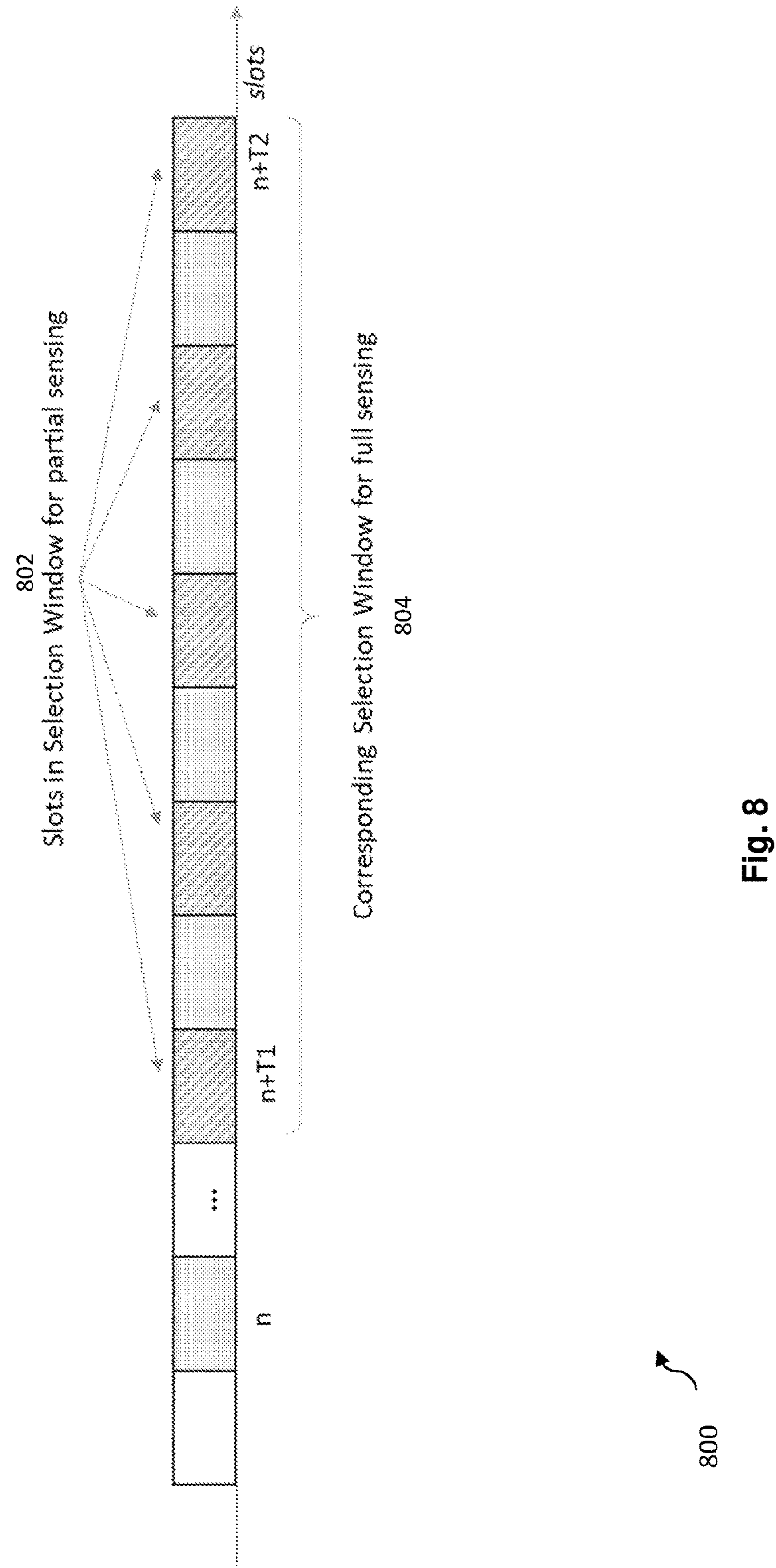
FIG. 8 shows an illustration of slots in selection window for partial sensing according to an example.

In an embodiment referring to FIG. 8, for sidelink resource selection for a UE based on partial sensing triggering (e.g., configured SL grant) at t=n, a selection window pattern of slots is defined with timing reference to t=n. The selection window pattern may be realized by a formula or pre-defined calculation rules. For example, every kth slot from t=n (or several continuous slots for every k slots) within corresponding selection window 804 for full sensing of [n+T1, n+T2] with reference to t=n may be defined for partial sensing (i.e. slots in selection window 802 for partial sensing) where, in the case of FIG. 8, k=2. Further, even for another UE with a same k=2, the selection window pattern for the another UE may be different. For example, the selection window pattern for the another UE may be defined with timing reference to t=n+1, such that slots in selection window 802 is for the UE of FIG. 8, while the remaining slots in selection window 804 is for partial sensing for the another UE. It will be appreciated that other variations to the selection window patterns for partial sensing and timing reference are possible.

The slots are not necessary to be discrete or periodic. The pattern may be a bitmap pre-defined by specification, another communication apparatus such as a gNB or a UE, regulator, or UE vendor with reference to t=n. The pattern may be indicated from another communication apparatus such as the gNB. The pattern can also be a shortened window of continuous slots in the corresponding selection window for full sensing that can be realized by applying a multiplier coefficient M (within range 0≤M≤1) or other rules. For example, in the illustration 900 of FIG. 9 where M=0.5, the selection window 902 for partial sensing are all the applicable slots in [n+T1, n+floor(M*T2)], while the corresponding selection window 904 for full sensing is [n+T1, n+T2]. The coefficient M can be explicitly indicated via SIB (signal information block), RRC, configured SL grant, and other similar ways, or pre-defined in specification or by some calculation rules. Further, the operations can apply to either periodic or aperiodic transmissions.

Figure 10:
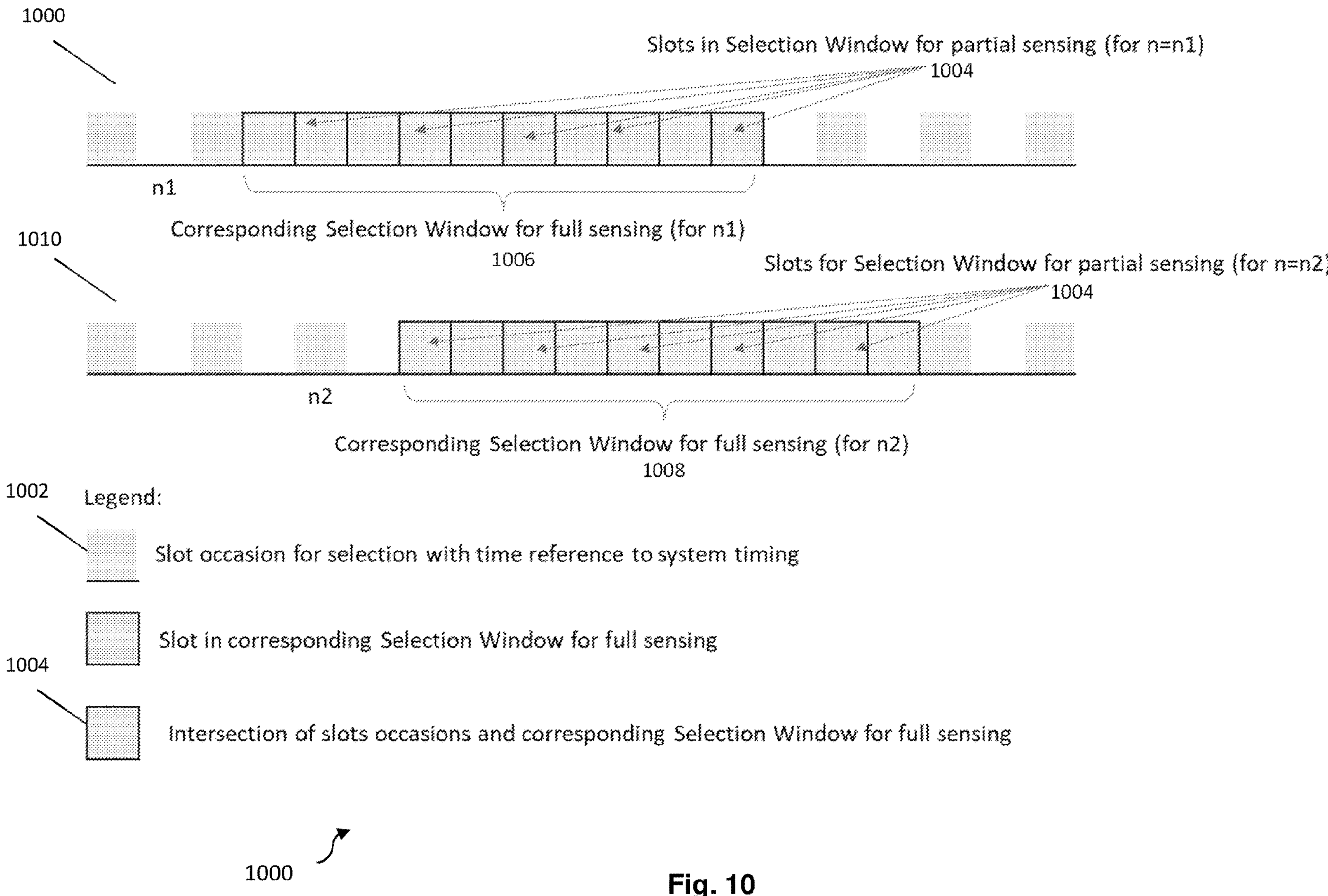
FIG. 10 shows an illustration of how slots for selection window for partial sensing are determined with reference to system timing according to various embodiments.

In an embodiment referring to diagrams 1000 and 1010 of FIG. 10, for sidelink resource selection based on partial sensing triggering at t=n (e.g., configured SL grant), selection window pattern of slots 1004 is defined with timing reference to system timing (e.g., an absolute slot number). The pattern may be an intersection of a time frame (i.e. corresponding selection windows 1006 (for an absolute slot number n1 in diagram 1000) or 1008 (for an absolute slot number n2 in diagram 1010) for full sensing) with pre-defined slot occasions 1002 with timing reference to absolute timing (i.e. absolute slot numbers n1 in diagram 1000 or n2 in diagram 1010). For example, pre-defined slots occasions in FIG. 10 are the slots of floor(t/j) where j=2. The time frame in diagram 1000 is corresponding selection window 1006 for full sensing of [n+T1, n+T2] and the time frame in diagram 1010 is corresponding selection window 1008 for full sensing of [n+T1, n+T2].

The slot occasions may be defined using formulas, bitmaps or descriptive rules by specifications, gNB, regulators or UE vendors. The slot occasions may be discrete or continuous, with or without periodicity. Further, the operations may apply to either periodic or aperiodic transmissions.

Figure 9:
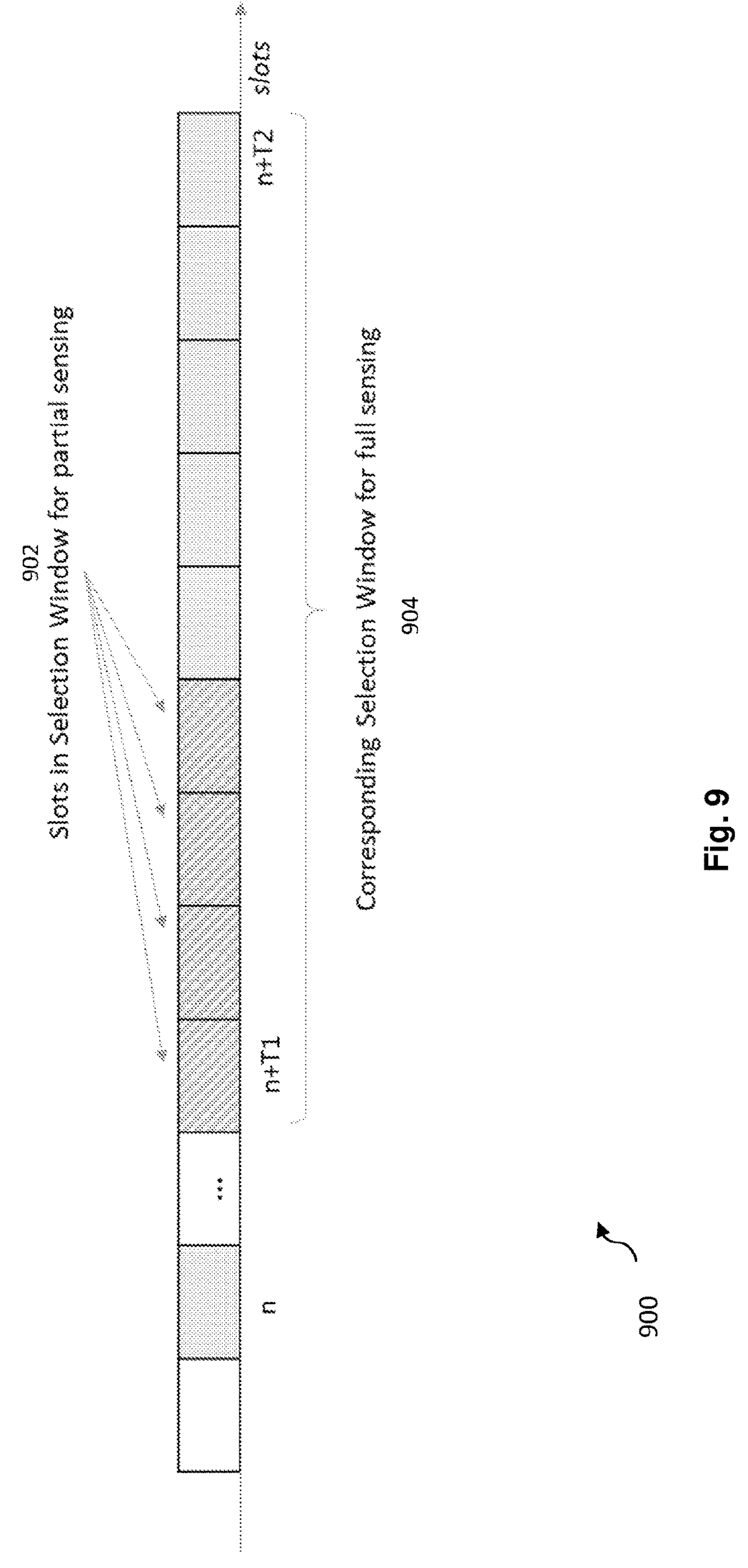
FIG. 9 shows another illustration of slots in selection window for partial sensing according to another example.

For either the operation as depicted in FIGS. 8 and 9 or the operation as depicted in FIG. 10, the selection window pattern of slots may be defined with timing reference to t=n, and not necessarily depending on the slots in the selection window as in LTE. The selection window pattern may be realized by a formula or pre-defined calculation rules.

Figure 11:
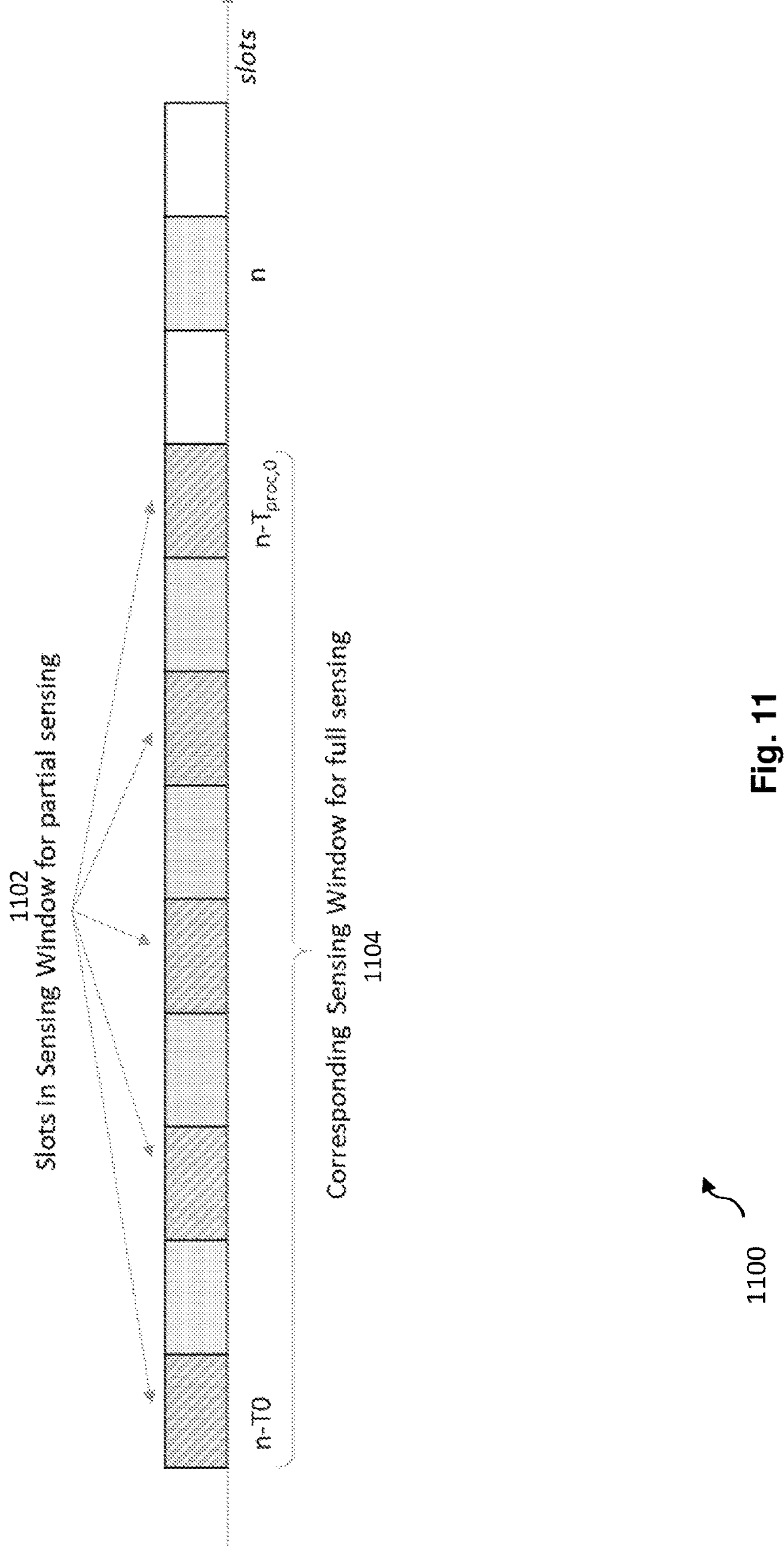
FIG. 11 shows an illustration of slots in sensing window for partial sensing according to an example.

Further referring to diagram 1100 of FIG. 11, the sensing window pattern may be defined as every $p^{th}$ slot from t=n (or several continuous slots for every p slots) within corresponding sensing window 1102 for full sensing of [n-$T_0$, n-$T_{proc,0}$] with reference to t=n. The slots are not necessary to be periodic nor discrete as in LTE.

Figure 12:
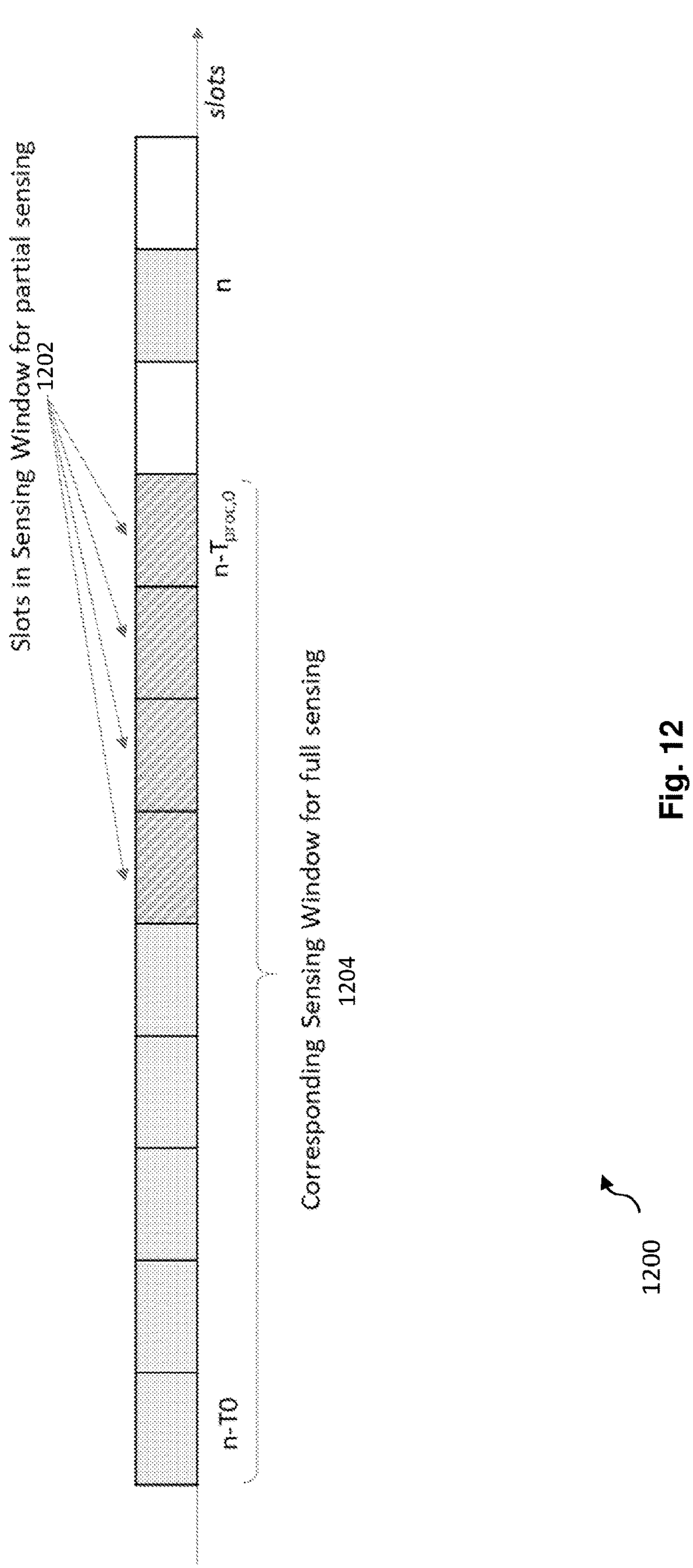
FIG. 12 shows another illustration of slots in sensing window for partial sensing according to another example.

The pattern may be a pre-defined bitmap (one-time or reusable) by specification, another communication apparatus such as a gNB or a UE, regulator, or UE vendor. The pattern may be indicated from another communication apparatus such as the gNB. The pattern may also be a shortened continuous window of the corresponding sensing window for full sensing, such that it can be realized by applying a multiplier coefficient N (with range $0<N\leq 1$) or other rules. For example, referring to diagram 1200 of FIG. 12 wherein N=0.5, sensing window 1202 for partial sensing are all the applicable slots in [n-floor(N*$T_0$), n-$T_{proc,0}$], while corresponding sensing window 1204 for full sensing is [n-$T_0$, n-$T_{proc,0}$]. The multiplier coefficient can be explicitly indicated via SIB, RRC, configured SL grant and other similar ways, or pre-defined in specification or by some calculation rules. Further, the operations can apply to either periodic or aperiodic transmissions.

Figure 13:
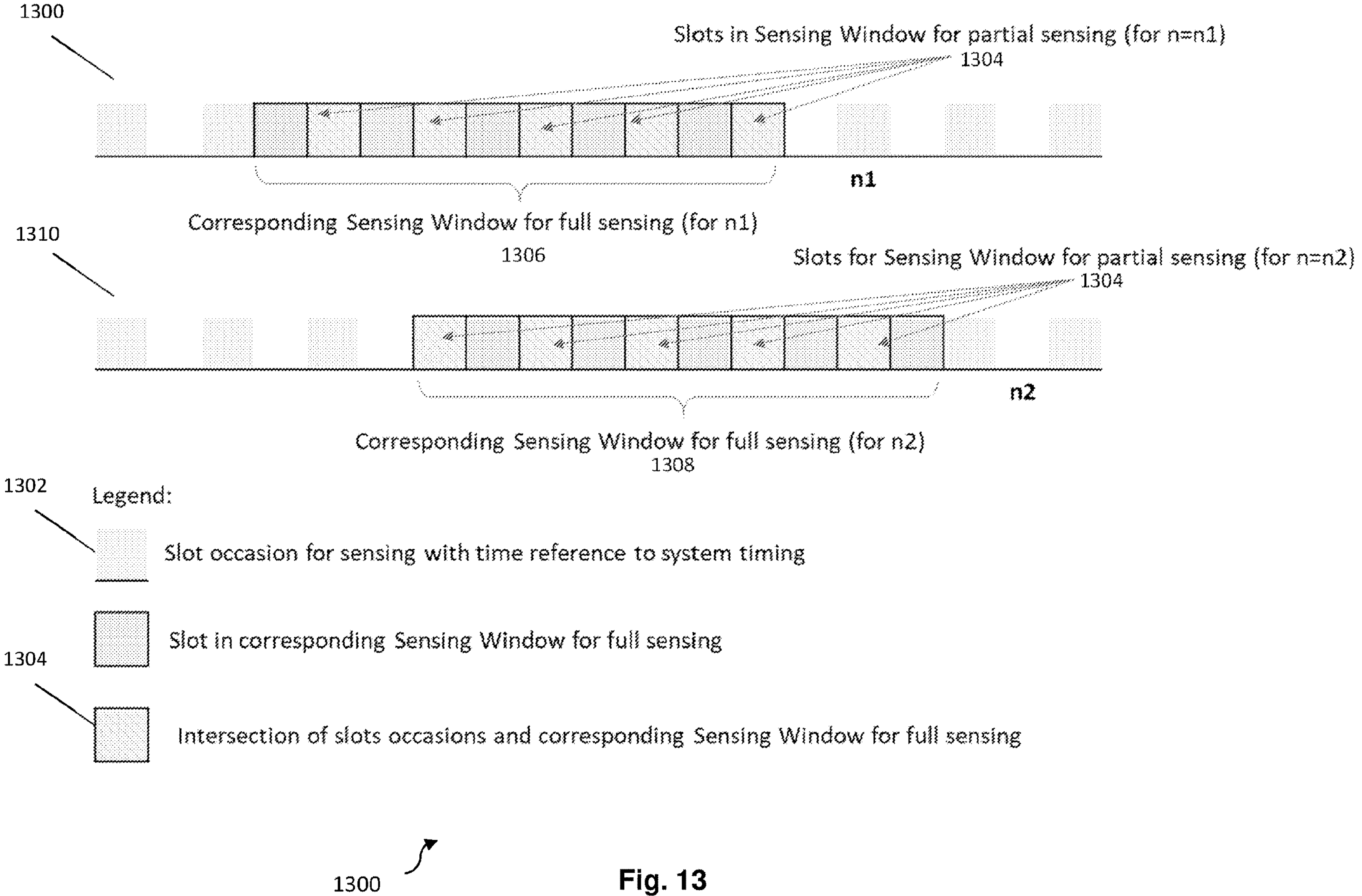
FIG. 13 shows an illustration of how slots for sensing window for partial sensing are determined with reference to system timing according to various embodiments.

For either the operation as depicted in FIGS. 8 and 9 or the operation as depicted in FIG. 10, the selection window pattern of slots may be defined with timing reference to system timing (e.g., absolute slot number), and not necessarily depending on the slots in the selection window as in LTE. The pattern may be an intersection of a time frame (e.g., the corresponding selection window for full sensing) with pre-defined slot occasions with timing reference to absolute timing. [74] Further referring to diagrams 1300 and 1310 of FIG. 13 wherein q=2, the pre-defined slots occasions 1302 are the slots of floor(t/q); while the frame is the corresponding sensing window for full sensing of [n-$T_0$, n-$T_{proc,0}$] i.e. corresponding sensing window 1306 in diagram 1300 and corresponding sensing window 1308 in diagram 1310. The resulting intersections of the slot occasions 1302 and corresponding sensing windows 1306 and 1308 are slots 1304 for sensing window for partial sensing. The slot occasions 1302 may be defined by specifications, gNB, regulators or UE vendors, and may be discrete or continuous, with or without periodicity. It will be appreciated that the operations may apply to either periodic or aperiodic transmissions.

For a same UE, the patterns may be different considering different priorities, congestion levels, CBR/CR (channel busy ratio/change request), etc. For either the selection window pattern or sensing window pattern with timing reference to system timing (or t=n), all UEs under a same cell (or country/region) should try to use the pre-defined slot occasions for their resource reservation or pre-emption signals, etc., thus the UE performing partial sensing can avoid in-air collisions. For a reservation by SCI (sidelink control information) is up to 32 slots, there should be at least one timing occasion every 32 slots. The reservation may be with first stage SCI with a standalone PSCCH or a PSCCH with dummy PSSCH, or second stage SCI. This can apply to either periodic or aperiodic transmissions.

For the non-sensing slots within the corresponding full sensing window [n-$T_0$, n-$T_{proc,0}^{SL}$], the UE should go into sleep mode (micro/light/deep sleep) for power saving as much as possible. For patterns consisting of discrete slots, the timing distance may be designed to be greater than the specified transition time of deep/light sleep if applicable.

A resource pool configured for full sensing may be exclusive to UEs with full sensing operation, while a resource pool configured for partial sensing may be exclusive to UEs with partial sensing operation. Alternatively, a resource pool configured for partial sensing can be accessed by either UEs with full sensing or partial sensing operation, or vice versa that a resource pool configured for full sensing can be accessed by either UEs with full sensing or partial sensing operation.

For a partial sensing pool accessible for both UEs with full sensing and UEs with partial sensing, the full sensing UEs should try to use resources in full sensing pool, such that the partial sensing pool is more prioritized for UEs with partial sensing operations. Further, for a "any combination" resource pool, UEs with full sensing operation (or partial sensing) should have more privileges; alternatively, UEs with full sensing operation and UEs with partial sensing operation may be treated equally.

Figure 14:
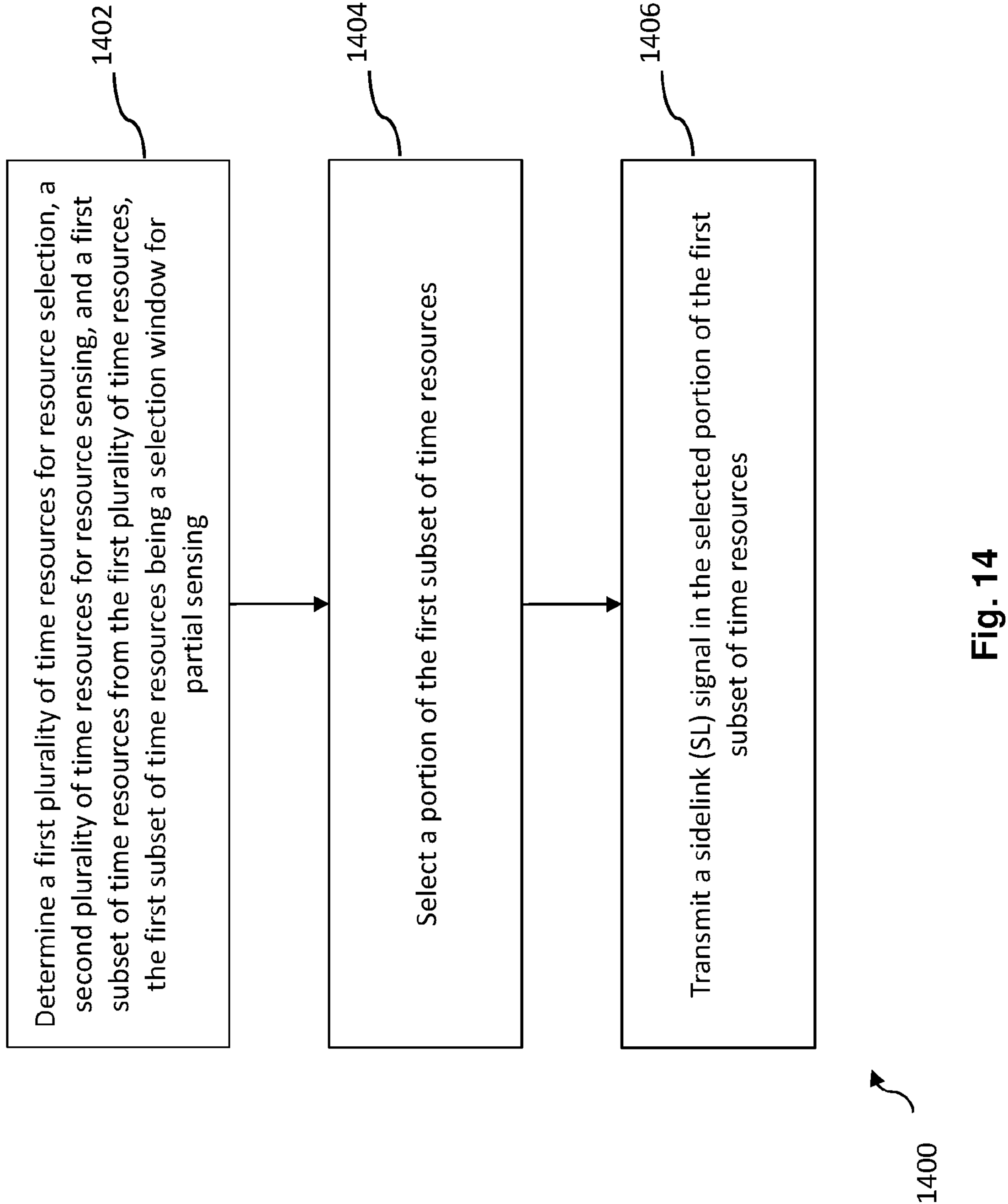
FIG. 14 shows a flow diagram illustrating a communication method according to various embodiments.

FIG. 14 shows a flow diagram 1400 illustrating a communication method according to various embodiments. In step 1402, a first plurality of time resources for resource selection, a second plurality of time resources for resource sensing, and a first subset of time resources from the first plurality of time resources are determined, the first subset of time resources being a selection window for partial sensing. In step 1404, a portion of the first subset of time resources is selected. In step 1406, a SL signal in the selected portion of the first subset of time resources is transmitted.

Figure 15:
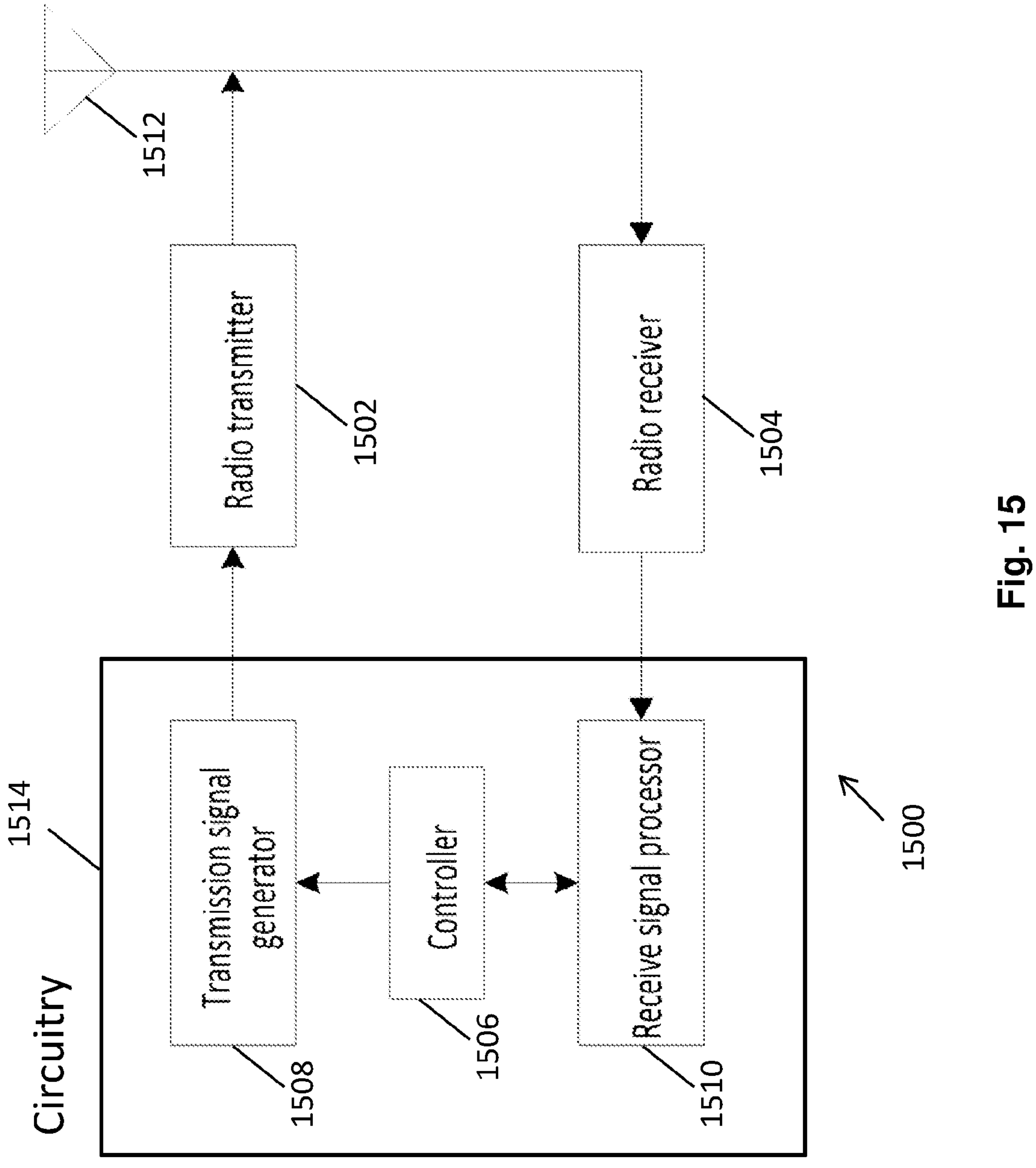
FIG. 15 shows a schematic example of communication apparatus in accordance with various embodiments.

FIG. 15 shows a schematic, partially sectioned view of the communication apparatus 1500 that can be implemented for selection and sensing windows for NR sidelink UEs with partial sensing in accordance with various embodiments and examples as shown in FIGS. 1 to 14. The communication apparatus 1500 may be implemented as a UE according to various embodiments.

Various functions and operations of the communication apparatus 1500 are arranged into layers in accordance with a hierarchical model. In the model, lower layers report to higher layers and receive instructions therefrom in accordance with 3GPP specifications. For the sake of simplicity, details of the hierarchical model are not discussed in the present disclosure.

As shown in FIG. 15, the communication apparatus 1500 may include circuitry 1514, at least one radio transmitter 1502, at least one radio receiver 1504, and at least one antenna 1512 (for the sake of simplicity, only one antenna is depicted in FIG. 15 for illustration purposes). The circuitry 1514 may include at least one controller 1506 for use in software and hardware aided execution of tasks that the at least one controller 1506 is designed to perform, including control of communications with one or more other communication apparatuses in a wireless network. The circuitry 1514 may furthermore include at least one transmission signal generator 1508 and at least one receive signal processor 1510. The at least one controller 1506 may control the at least one transmission signal generator 1508 for generating signals (for example, a signal indicating a geographical zone) to be sent through the at least one radio transmitter 1502 to one or more other communication apparatuses and the at least one receive signal processor 1510 for processing signals (for example, a signal indicating a geographical zone) received through the at least one radio receiver 1504 from the one or more other communication apparatuses under the control of the at least one controller 1506. The at least one transmission signal generator 1508 and the at least one receive signal processor 1510 may be stand-alone modules of the communication apparatus 1500 that communicate with the at least one controller 1506 for the above-mentioned functions, as shown in FIG. 15. Alternatively, the at least one transmission signal generator 1508 and the at least one receive signal processor 1510 may be included in the at least one controller 1506. It is appreciable to those skilled in the art that the arrangement of these functional modules is flexible and may vary depending on the practical needs and/or requirements. The data processing, storage and other relevant control apparatus can be provided on an appropriate circuit board and/or in chipsets. In various embodiments, when in operation, the at least one radio transmitter 1502, at least one radio receiver 1504, and at least one antenna 1512 may be controlled by the at least one controller 1506.

The communication apparatus 1500, when in operation, provides functions required for selection and sensing windows for NR sidelink UEs with partial sensing. For example, the communication apparatus 1500 may be a UE, and the circuitry 1514 may, in operation, determine a first plurality of time resources for resource selection, a second plurality of time resources for resource sensing, and a first subset of time resources from the first plurality of time resources, the first subset of time resources being a selection window for partial sensing, and select a portion of the first subset of time resources. The transmitter 1502 may, in operation, transmit a SL signal in the selected portion of the first subset of time resources.

The circuitry 1514 may be further configured to trigger the resource sensing and/or the resource selection based on a reference time slot, wherein the first plurality of time resources is before the reference time slot and the second plurality of time resources is after the reference time slot. The circuitry 1514 may be further configured to determine a third plurality of time resources, the third plurality of time resources being a time frame for partial sensing resource selection, wherein the first subset of time resources is an intersection of the third plurality of time resources and the first plurality of time resources.

The first subset of time resources may be determined using formulas, calculation rules or bitmap indication from the first plurality of time resources, or by applying a coefficient value to the first plurality of time resources, the first coefficient being greater than 0 and less than 1; wherein the formulas, the calculation rules, bitmap indication or coefficient value are defined with reference to the reference time slot, and wherein the formulas, calculation rules, bitmap indication or coefficient value are set by standardizations, base stations, regulators, or UE vendors. The second subset of time resources may be determined using formulas, calculation rules or bitmap indication from the second plurality of time resources, or by applying a coefficient value to the first plurality of time resources, the first coefficient being greater than 0 and less than 1; wherein the formulas, the calculation rules, bitmap indication or coefficient value are defined with reference to the reference time slot, and wherein the formulas, calculation rules, bitmap indication or coefficient value are set by standardizations, base stations, regulators, or UE vendors. The first subset of time resources and/or the second subset of time resources may be determined based on priorities, congestion levels and/or CBR/CR, and wherein a maximum and/or minimum number of time slots of the first subset of time resources and the second subset of time resources are determined based on formulas, calculation rules, bitmaps, or a preconfigured list. The first subset of time resources and/or the second subsets of time resources may be different among the communication apparatus and another communication apparatus. The first subset of time resources and/or the second subsets of time resources may be different among the communication apparatus and another communication apparatus, even when the first plurality of time resources is same among the communication apparatus and the another communication apparatus. The first subset of time resources and/or the second subsets of time resources in a first time slot may be different from that in a second time slot. The first subset of time resources and/or the second subsets of time resources of the communication apparatus may be different from that of another communication apparatus, based on at least one of a UEID, a value indicated by a base station, a priority, a congestion level, a CBR/CR and UE type of the communication apparatus and/or the another communication apparatus. The communication apparatus may be active in the second subset of time resources and during the SL signal transmission in the selected portion in the first subset of time resources, and inactive for other time resources in the first plurality of time resources and the second plurality of time resources.

The circuitry 1514 may be further configured to determine a fourth plurality of time resources, the fourth plurality of time resources being a time frame for partial sensing resource sensing, wherein the second subset of time resources is an intersection of the fourth plurality of time resources and the second plurality of time resources. The circuitry 1514 may be further configured to synchronize the communication apparatus to a system timing, and wherein the third and/or fourth plurality of time resources are determined based on the system timing. The fourth plurality of time resources may be a same time frame as the third plurality of time resources. The third and/or fourth plurality of time resources may be determined based on formulas, calculation rules, or bitmaps, wherein the formulas, calculation rules, or bitmaps may be defined by standardizations, base stations, regulators, or UE vendors. The third and/or fourth plurality of time resources may comprise continuous or discrete time slots which are either periodic or aperiodic.

(Control Signals)

In the present disclosure, the downlink control signal (information) related to the present disclosure may be a signal (information) transmitted through PDCCH of the physical layer or may be a signal (information) transmitted through a MAC Control Element (CE) of the higher layer or the RRC. The downlink control signal may be a pre-defined signal (information).

The uplink control signal (information) related to the present disclosure may be a signal (information) transmitted through PUCCH of the physical layer or may be a signal (information) transmitted through a MAC CE of the higher layer or the RRC. Further, the uplink control signal may be a pre-defined signal (information). The uplink control signal may be replaced with uplink control information (UCI), the 1st stage sidelink control information (SCI) or the 2nd stage SCI.

(Base Station)

In the present disclosure, the base station may be a Transmission Reception Point (TRP), a clusterhead, an access point, a Remote Radio Head (RRH), an eNodeB (eNB), a gNodeB (gNB), a Base Station (BS), a Base Transceiver Station (BTS), a base unit or a gateway, for example. Further, in side link communication, a terminal may be adopted instead of a base station. The base station may be a relay apparatus that relays communication between a higher node and a terminal. The base station may be a roadside unit as well.

(Uplink/Downlink/Sidelink)

The present disclosure may be applied to any of uplink, downlink and sidelink.

The present disclosure may be applied to, for example, uplink channels, such as PUSCH, PUCCH, and PRACH, downlink channels, such as PDSCH, PDCCH, and PBCH, and side link channels, such as Physical Sidelink Shared Channel (PSSCH), Physical Sidelink Control Channel (PSCCH), and Physical Sidelink Broadcast Channel (PSBCH).

PDCCH, PDSCH, PUSCH, and PUCCH are examples of a downlink control channel, a downlink data channel, an uplink data channel, and an uplink control channel, respectively. PSCCH and PSSCH are examples of a sidelink control channel and a sidelink data channel, respectively. PBCH and PSBCH are examples of broadcast channels, respectively, and PRACH is an example of a random access channel.

(Data Channels/Control Channels)

The present disclosure may be applied to any of data channels and control channels. The channels in the present disclosure may be replaced with data channels including PDSCH, PUSCH and PSSCH and/or control channels including PDCCH, PUCCH, PBCH, PSCCH, and PSBCH.

(Reference Signals)

In the present disclosure, the reference signals are signals known to both a base station and a mobile station and each reference signal may be referred to as a Reference Signal (RS) or sometimes a pilot signal. The reference signal may be any of a DMRS, a Channel State Information—Reference Signal (CSI-RS), a Tracking Reference Signal (TRS), a Phase Tracking Reference Signal (PTRS), a Cell-specific Reference Signal (CRS), and a Sounding Reference Signal (SRS).

(Time Intervals)

In the present disclosure, time resource units are not limited to one or a combination of slots and symbols, and may be time resource units, such as frames, superframes, subframes, slots, time slot subslots, minislots, or time resource units, such as symbols, Orthogonal Frequency Division Multiplexing (OFDM) symbols, Single Carrier-Frequency Division Multiplexing Access (SC-FDMA) symbols, or other time resource units. The number of symbols included in one slot is not limited to any number of symbols exemplified in the embodiment(s) described above, and may be other numbers of symbols.

(Frequency Bands)

The present disclosure may be applied to any of a licensed band and an unlicensed band.

(Communication)

The present disclosure may be applied to any of communication between a base station and a terminal (Uu-link communication), communication between a terminal and a terminal (Sidelink communication), and Vehicle to Everything (V2X) communication. The channels in the present disclosure may be replaced with PSCCH, PSSCH, Physical Sidelink Feedback Channel (PSFCH), PSBCH, PDCCH, PUCCH, PDSCH, PUSCH, and PBCH.

In addition, the present disclosure may be applied to any of a terrestrial network or a network other than a terrestrial network (NTN: Non-Terrestrial Network) using a satellite or a High Altitude Pseudo Satellite (HAPS). In addition, the present disclosure may be applied to a network having a large cell size, and a terrestrial network with a large delay compared with a symbol length or a slot length, such as an ultra-wideband transmission network.

(Antenna Ports)

An antenna port refers to a logical antenna (antenna group) formed of one or more physical antenna(s). That is, the antenna port does not necessarily refer to one physical antenna and sometimes refers to an array antenna formed of multiple antennas or the like. For example, it is not defined how many physical antennas form the antenna port, and instead, the antenna port is defined as the minimum unit through which a terminal is allowed to transmit a reference signal. The antenna port may also be defined as the minimum unit for multiplication of a precoding vector weighting.

The following statements are described in the present disclosure:

Statement 1. A communication apparatus comprising:

a circuitry, which in operation, configures a first plurality of time resources for a resource selection and a second plurality of time resources for a resource sensing;

the circuitry, which in operation, configures a first subset of time resources from the first plurality of time resource, and a transmitter, which in operation, transmits a sidelink signal in a part of the first subset of time resources.

Statement 2. The first subset of time resources can be different among the communication apparatus and another communication apparatus.

Statement 3. The first subset of time resources can be different among the communication apparatus and another communication apparatus, even in case the first plurality of time resources is same among the communication apparatus and the other communication apparatus.

Statement 4. The circuitry, which in operation, further configures a second subset of time resources from the second plurality of time resource.

Statement 5. The second subset of time resources can be different among the communication apparatus and another communication apparatus.

Statement 6. The second subset of time resources can be different among the communication apparatus and another communication apparatus, even in case the second plurality of time resources is same among the communication apparatus and the other communication apparatus.

Statement 7. The first subset of time resources and the second subset of time resource can be applied to either periodic sidelink transmissions or aperiodic sidelink transmissions.

Statement 8. The circuitry, which in operation, triggers/identifies the resource sensing and/or the resource selection based on a triggering/determined time slot. The first plurality of time resources is before the triggering/determined time slot and the second plurality of time resources is after the triggering/determined time slot.

Statement 9. The first subset of time resources can be identified by using formulas or calculation rules from the first plurality of time resources, the formulas or the calculation rules being defined with a time reference to the triggering/determined time slot.

Statement 10. The formulas or the calculation rules to identify the first subset of time resources can be defined by either standardizations, base stations, regulators, or UE vendors.

Statement 11. The first subset of time resources, can be identified by a bitmap indication to the first plurality of time resources, the bitmap indication being associated with a time reference to the triggering/determined slot Statement 12. The bitmap indication to identify the first subset of time resources can be defined by either standardizations, base stations, regulators, or UE vendors.

Statement 13. The first subset of time resources can be determined by applying a first coefficient to the first plurality of time resources, the first coefficient being greater than 0 and less than 1

Statement 14. The first coefficient to determine the first subset of time resources can be defined by either standardizations, base stations, regulators, or UE vendors.

Statement 15. The first subset of time resources consists of continuous or discrete time slots, either periodic or aperiodic.

Statement 16. The first subset of time resources is configured periodically within the first plurality of time resources.

Statement 17. The first subset of time resources in a first time slot can be different from the first subset of time resources in a second time slot.

Statement 18. The first subset of time resources of the communication apparatus is different from that of the other communication apparatus, based on at least one of a UEID, a value indicated by a base station, a priority, a congestion level, a CBR/CR and a type of UEs.

Statement 19. The circuitry, which in operation, synchronizes the communication apparatus to a system timing.

Statement 20. The first subset of time resources is an intersection of a third plurality of time resources and the first plurality of time resources.

Statement 21. The third plurality of time resources is with time reference to the system timing.

Statement 22. The third plurality of time resources can be identified by formulas, calculation rules, or bitmaps.

Statement 23. The formulas, calculation rules, or bitmaps to identify the third plurality of time resources can be defined by either standardizations, base stations, regulators, or UE vendors.

Statement 24. The third plurality of time resources consists of continuous or discrete time slots, either periodic or aperiodic.

Statement 25. The second subset of time resources, can be identified by using formulas or calculation rules from the second plurality of time resources, the formulas or the calculation rules are with time reference to the triggering/determined time slot.

Statement 26. The formulas or the calculation rules to identify the second subset of time resources can be defined by either standardizations, base stations, regulators, or UE vendors.

Statement 27. The second subset of time resources, can be identified by a bitmap indication to the second plurality of time resources, the bitmap indication being with time reference to the triggering/determined slot.

Statement 28. The bitmap to identify the second subset of time resources can be defined by either standardizations, base stations, regulators, or UE vendors.

Statement 29. The second subset of time resources, can be identified by applying a second coefficient to the second plurality of time resources, the second coefficient being greater than 0 and less than 1.

Statement 30. The second coefficient to determine the second subset of time resources can be identified by either standardizations, base stations, regulators, or UE vendors.

Statement 31. The second subset of time resources consists of continuous or discrete time slots, either periodic or aperiodic.

Statement 32. The second subset of time resources can be configured periodically within the second plurality of time resources.

Statement 33. The second subset of time resources in a first time slot can be different from the second subset of time resources in a second time slot.

Statement 34. The second subset of time resources of the communication apparatus is different from that of the other communication apparatus, based on at least one of a UEID, a value indicated by a base station, a priority, a congestion level, a CBR/CR and a type of UEs.

Statement 35. The second subset of time resources, is an intersection of a fourth plurality of time resources and the first plurality of time resources.

Statement 36. The fourth plurality of time resources is with time reference to the system timing.

Statement 37. The fourth plurality of time resources can be same as the third plurality of time resources.

Statement 38. The fourth plurality of time resources can be identified by formulas, calculation rules, or bitmaps.

Statement 39. The formulas, calculation rules, or bitmaps to identify the fourth plurality of time resources can be defined by either standardizations, base stations, regulators, or UE vendors.

Statement 40. The fourth plurality of time resources consists of continuous or discrete time slots, either periodic or aperiodic.

Statement 41. The circuitry, which in operation, can configure different first subsets of time resources based on different priorities, congestion levels, CBR/CR, etc.

Statement 42. The circuitry, which in operation, can configure different second subsets of time resources based on different priorities, congestion levels, CBR/CR, etc.

Statement 43. The communication apparatus, and other communication apparatuses under same cell coverage, or in same country/region, should use the same third plurality of time resources.

Statement 44. The communication apparatus, and other communication apparatuses under same cell coverage, or in same country/region, should use the same fourth plurality of time resources.

Statement 45. The communication apparatus, can be active only in the second subset of time resources, and inactive for the other time resource in the second plurality of time resources.

Statement 46. The communication apparatus, can be active only in the selected time resource for transmission in the first subset of time resources, and inactive for other time resources in the first plurality of time resources.

Statement 47. The circuitry, which in operation, configures a first plurality of time frequency resources for other communication apparatuses with full sensing operation.

Statement 48. The circuitry, which in operation, configures a second plurality of time frequency resources for other communication apparatuses with partial sensing operation.

Statement 49. The circuitry, which in operation, configures a third plurality of time frequency resources for other communication apparatuses with full sensing and communication apparatuses with partial sensing operation.

Statement 50. The first plurality of time frequency resources can be exclusive for the other communication apparatuses with full sensing operation, or can be used by both the other communication apparatuses with full sensing operation and the other communication apparatuses with partial sensing operation.

Statement 51. The second plurality of time frequency resources can be exclusive for the other communication apparatuses with partial sensing operation, or can be used by both the other communication apparatuses with full sensing operation and the other communication apparatuses with partial sensing.

Statement 52. The other communication apparatuses with full sensing operation, should prioritize a usage of the first plurality of time frequency resources, and then a usage of the third plurality of time frequency resources or the second plurality of time frequency resources.

Statement 53. The other communication apparatuses with partial sensing operation, should prioritize a usage of the second plurality of time frequency resources and then a usage of the third plurality of time frequency resources or the first plurality of time frequency resources.

Statement 54. The third plurality of time frequency resources, can be more privileged for the other communication apparatuses with full sensing operation, or same for the other communication apparatuses with full sensing operation and the other communication apparatuses with partial sensing operation.

As described above, the embodiments of the present disclosure provide an advanced communication system, communication methods and communication apparatuses for selection and sensing windows for NR sidelink UEs with partial sensing that advantageously enables power saving in UEs.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication apparatus.

Some non-limiting examples of such communication apparatus include a phone (e.g, cellular (cell) phone, smart phone), a tablet, a personal computer (PC) (e.g, laptop, desktop, netbook), a camera (e.g, digital stilVvideo camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (lop".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It will be understood that while some properties of the various embodiments have been described with reference to a device, corresponding properties also apply to the methods of various embodiments, and vice versa.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

The invention claimed is:

1. A communication apparatus comprising:

a receiver, which in operation, receives control information relating to a first subset of time resources within multiple time resources used for full sensing, the first subset of time resources being a subset of resources to be reported to higher layers for Physical Sidelink Shared Channel (PSSCH) or Physical Sidelink Control Channel (PSCCH) transmission in sidelink resource allocation; and circuitry, which in operation, performs partial sensing at the first subset of time resources, which is determined based on the control information, wherein the first subset of time resources is determined based on a formula or calculation rule with reference to a reference time slot.

2. The communication apparatus of claim 1, wherein the first subset of time resources is discrete with periodicity.

3. The communication apparatus of claim 1, wherein the first subset of time resources includes every X slots from the reference time slot.

4. The communication apparatus of claim 1, wherein the first subset of time resources is different from a subset for another communication apparatus.

5. The communication apparatus of claim 1, wherein the control information is transmitted by RRC (radio resource control) signaling.

6. The communication apparatus of claim 1, wherein the circuitry, in operation, determines a second subset of time resources for resource selection.

7. The communication apparatus of claim 1, wherein the circuitry, in operation, performs resource sensing based on the reference time slot, wherein the first subset of time resources is before the reference time slot.

8. A communication method comprising:

receiving control information relating to a first subset of time resources within multiple resources used for full sensing, the first subset of time resources being a subset of resources to be reported to higher layers for Physical Sidelink Shared Channel (PSSCH) or Physical Sidelink Control Channel (PSCCH) transmission in sidelink resource allocation; and performing partial sensing at the first subset of time resources, which is determined based on the control information, wherein the first subset of time resources is determined based on a formula or calculation rule with reference to a reference time slot.

9. The communication method of claim 8, wherein the first subset of time resources is discrete with periodicity.

10. The communication method of claim 8, wherein the first subset of time resources includes every X slots from the reference time slot.

11. The communication method of claim 8, wherein the first subset of time resources is different from a subset for another communication apparatus.

12. The communication method of claim 8, wherein the control information is transmitted by RRC (radio resource control) signaling.

13. The communication method of claim 8, comprising:

determining a second subset of time resources for resource selection.

14. The communication method of claim 8, comprising:

performing resource sensing based on the reference time slot, wherein the first subset of time resources is before the reference time slot.

* * * * *